3,293,212
THERMOSETTING REACTION PRODUCT OF HEXAKIS - (ALKOXYMETHYL)MELAMINES AND BISPHENOLS
George Edward Power, Cincinnati, Ohio, and Robert James Kassal, Gainesville, Fla., assignors to American Cyanamid Company, Stamford, Conn., a corporation of Maine
No Drawing. Filed June 24, 1963, Ser. No. 290,232
5 Claims. (Cl. 260—47)

This invention relates to thermosetting reaction products of hexaalkyl ethers of hexamethylol melamines and bisphenols. More particularly, this invention relates to thermosetting reaction products of hexaalkyl ethers of hexamethylol melamines and bisphenols which reaction products are capable of producing excellent electrical grade melamine laminates and heat resistant surface coatings. Still more particularly, this invention relates to the production of thermosetting reaction products of, for example, hexakis(methoxymethyl)melamine and, for example, 4,4'-dihydroxy-2,2-diphenylpropane, which products are capable of being used for the manufacture of excellent electrical grade melamine laminates and surface coatings of high heat resistance and a method for producing the same.

The production of thermosetting reaction products from alkylated melamine-formaldehyde condensation products and epichlorohydrin-Bisphenol A reaction products are known in the art, as exemplified, for example, by U.S. Patent No. 2,676,162 to Marotta.

We have now found, however, that thermosetting resins produced from hexaalkyl ethers of hexamethylol melamines and bisphenols show excellent flexural strength and electrical properties when cast or otherwise cured to form, e.g. laminates and surface coatings. Previous to our invention, when products having minimum cracking and maximum flexural strength at elevated temperatures were desired, it was generally considered necessary to employ a reaction product possessing epoxide groups, such as those resulting from epichlorohydrin reactions. We have now surprisingly found that reaction products can now be produced which have properties superior in many respects to those reaction products of the prior art mentioned above, without the necessity of introducing an epoxide radical-containing compound during the production of said products.

It is therefore an object of this invention to present novel reaction products of hexaalkyl ethers of hexamethylolmelamines and bisphenols.

It is a further object of this invention to present thermosetting reaction products of hexaalkyl ethers of hexamethylolmelamines and bisphenols which products possess, when cured, improved heat resistance, craze resistance and electrical properties.

It is still a further object of this invention to present novel thermosetting reaction products of, for example, hexakis(methoxymethyl)melamine and, for example, 4,4'-dihydroxy-2,2-diphenylpropane.

These and other objects will become more apparent to those skilled in the art upon reading the more detailed description set forth hereinbelow.

THE HEXAALKYL ETHERS OF HEXAMETHYLOL MELAMINES

The hexaalkyl ethers of hexamethylolmelamines applicable in the production of the novel thermosetting reaction products of the instant invention have the general formula (I) 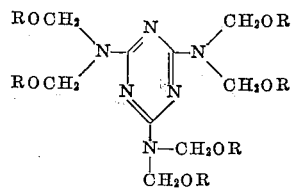

wherein R is an alkyl group having 1 to 4 carbon atoms, inclusive. Examples of compounds represented by Formula I, above, and methods for preparing them, are set forth specifically in U.S. Patents 2,918,452, 2,998,410 and 2,998,411.

Specific examples of the compounds represented by Formula I, above, include hexakis(methoxymethyl)melamine, hexakis(ethoxymethyl)melamine, hexakis(n-propoxymethyl)melamine, hexakis(isopropoxymethyl)melamine, hexakis(n-butoxymethyl)melamine, hexakis(t-butoxymethyl)melamine, hexakis(isobutoxymethyl)melamine and the like.

The hexaalkoxymethylmelamine constituents of our novel compositions are very difficult to prepare in the pure state. That is to say, in the known processes for the preparation of these highly etherified, highly methylolated melamines, the analysis of the final products indicates that the average alkylolation is less than hexaalkylol melamine. Likewise, the average degree of alkylation appears to be less than the hexaalkyl ether. Notwithstanding this indication, these products are deemed to contain a preponderance of the hexaalkyloxymethylmelamine compound and lesser amounts of the mono, di, tri, tetra, penta, etc. compounds.

In view of the discussion hereinabove, it is therefore to be understood that wherever hexaalkoxymethylmelamines are referred to herein, compositions which contain melamine derivatives that are (on an average) not fully alkylolated or fully methylolated but which approach such full alkylolation and etherification, are encompassed and are substantially equivalent to pure hexaalkoxymethylmelamines.

THE BISPHENOLS

The bisphenols which constitute the second reactive ingredient of the reaction products of the present invention have the structural formula (II) 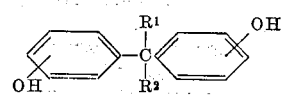

wherein $R^1$ and $R^2$ are the same or different and are hydrogen or an alkyl radical having 1 to 4 carbon atoms, inclusive, and $R^1$ and $R^2$ may form, with the central carbon atom, at least a 5-membered cyclic saturated hydrocarbon ring.

Examples of compounds which are represented by Formula II include 4,4'-dihydroxydiphenylmethane, 2,2'-dihydroxydiphenylmethane, 3,3' - dihydroxydiphenylmethane, 4,4'-dihydroxy-1,1-diphenylethane, 4,4'-dihydroxy-2,2-diphenylpropane, 4,4'-dihydroxy-2,2-diphenylbutane, 4,4'-dihydroxy-3,3-diphenylpentane, 4,4'-dihydroxy - 3,3-diphenylhexane, 4,4'-dihydroxy-4,4-diphenylheptane, 4,4'-dihydroxy-4,4-diphenyloctane, 3,3'-dihydroxy-5,5 - diphenylnonane, 2,2'-dihydroxydiphenylcyclohexane, 3,3' - dihydroxydiphenylcyclopentane and the like.

THE REACTION PROCESS

The novel thermosetting reaction products of the present invention are prepared by reacting a compound represented by Formula I, above, with a compound represented by Formula II, above, in solution and in the presence of an acid catalyst. The reaction produces ring alkylation on the ring of the bisphenol of the second reaction component, as exemplified by the following equation:

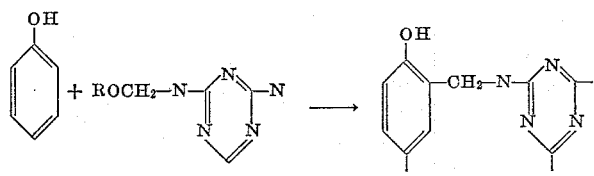

Although not wishing to be bound by the above theorized structures, we believe that such structures are probable, as representative of our novel reaction products, in view of the excellent properties, such as flexural strength of these products at high temperatures.

The temperature at which the above reaction products are produced generally ranges from about 50° C. to about 150° C., preferably about 80° C. to about 120° C. Atmospheric pressure is generally preferred. It may be necessary however, depending upon the alcohol by-product which is produced during the reaction, to carry out the process under vacuum. That is to say, depending upon whether methanol, butanol, etc. is produced as a by-product, as governed by the specific polyalkyl ether employed, pressures are used, which will enable these alcohols to be driven off as gasses, that is to say, the higher the alcohol being driven off, the lower the pressure used.

The molar ratio of the bisphenol to the polyalkyl ether of the polymethylolmelamine ranges from about 2:1 to 1:2, respectively. Although generally molar equivalents are employed, a slight excess of either component may be tolerated and is, in fact, considered more practical in that more complete reactions are insured in this manner.

The acid catalysts which may be employed include such mineral acids as sulfuric acid, hydrochloric acid, p-toluene sulfonic acid and the like as well as such organic acids as phthalic acid, oxalic, acetic acid, chloroacetic acid and the like. The catalyst concentrations employed generally range from about 0.1 to about 5.0%, preferably about 1.0 to about 2.0%, by weight, based on the combined weight of the monomer components.

As mentioned above, the reaction is preferably carried out in the presence of a solvent for both constituents, examples of which include the ketones such as acetone, methyl ethyl ketone, etc. the aromatic hydrocarbons such as benzene, toluene, etc. the chlorinated hydrocarbons such as chlorobenzene, etc., dioxane, butyl acetate, and the like. The concentration of solvent employed is not critical and generally any amount which solubilizes the reaction components is all that is necessary.

The time of contact of the two components in producing the novel reaction products of the present invention is not critical except that the reaction must be terminated before gelation occurs. That is to say, depending upon the viscosity etc. of the reaction product, the reaction must be terminated before gelation, since, if not, the product will become thermoset and inapplicable for usage for such applications as laminates, coatings and the like. It is possible, however, to proceed to gelation during the reaction if a molded article, laminate or coating etc. is being produced in situ. This may be accomplished by proceeding under the conditions expressed above to gelation to produce a thermoset product of the desired type.

Various additives such as plasticizers, stabilizers, dyes, fillers, pigments, absorbers and the like may be added to our novel reaction products, before or during curing, without departing from the spirit and scope of the present invention.

The following examples are set forth for purposes of illustration only and are not to be construed as limitations on the present invention except as set forth in the appended claims. All parts and percentages are by weight unless otherwise specified.

Example 1

To a suitable reaction vessel, equipped with stirring means, thermometer and reflux condenser, are charged 100 parts of hexakis(methoxymethyl)melamine. The vessel is heated to 120° C. and 176 parts of 4,4'-dihydroxy-diphenyl-2,2-propane are slowly added with agitation. Heating is continued until the solution is complete and the reaction mixture is then cooled to 90° C. One part of p-toluenesulfonic acid is then added and heating is continued to 110° C. for 5 minutes. Acetone (100 parts) is then slowly added through the condenser. The temperature falls to 70° C. and is cooled to room temperature. A resin solution is recovered.

Example 2

Glass cloth is treated with 100 parts of the resin solution produced in Example 1 and is dried five minutes in an infra-red dryer at 160° C. The glass cloth is pressed at a temperature of about 240° C. under 1100 p.s.i. for 15 minutes to produce a pressed laminate having the following physical properties compared to those of a laminate produced from a commercially available Bisphenol A-epichlorhydrin liquid condensation product; viscosity at 25° C.=100–160 poises; Epoxide equivalent=175–210.

TABLE I.—FLEXURAL STRENGTH (lb./in.²)

| Product | 23° C. | 150° C. | 192 Hours Exposure at 260° C. |
|---|---|---|---|
| Example 1 | 51,000 | 40,500 | 22,600 |
| Commercially available | 58,000 | 34,000 | 12,000 |

After 8 days at 160° C., the lamniate shows very slight crazing (Example 1).

The electrical properties of the laminate (Ex. 1) produced are shown below in Table II. The term "short time" refers to the time when breakdown of the laminate occurs by conducting an electrical charge through it.

TABLE II.—ELECTRICAL PROPERTIES

| Dielectric Strength, Short Time | Dielectric Constant and Dissipation Factor | | | |
|---|---|---|---|---|
| | Condition A* | | D24/23† | |
| | DC | DF | DC | DF |
| 85 mills thickness, 580 VPM | ‡10²—4.72<br>10³—4.65<br>10⁶—4.27 | 0.017<br>0.010<br>0.006 | 4.81<br>4.71<br>4.33 | 0.016<br>0.012<br>0.007 |

*23° C. and 50% relative humidity.
†After soaking in water at 23° C. for 24 hours.
‡Frequencies in cycles/sec.

Table III below shows results of various laminates produced according to the process of the present invention and compared to commercially available products and other diols and triols.

TABLE III

| Ex. | Diol | Melamine Compound | Weight Loss percent at 200° F. As Laminate | | |
|---|---|---|---|---|---|
| | | | A[1] | B[2] | C[3] |
| 3 | 1,4-butanediol | Hexakis(methoxymethyl)melamine | 6.78 | 8.19 | 9.70 |
| 4 | Octalene glycol | ____do____ | 13.9 | 15.7 | 18.5 |
| 5 | Triethylene glycol | ____do____ | 22.3 | 28.6 | 35.2 |
| 6 | Trimethylol propane | ____do____ | 6.85 | 7.66 | 8.44 |
| 7 | Glycerine | ____do____ | 6.39 | 7.05 | 7.82 |
| 8 | 1,2,6,-hexane triol | ____do____ | 4.97 | 6.56 | 7.52 |
| 9 | 4,4'-dihydroxy-2,2-diphenylbutane | ____do____ | 0.075 | 0.604 | 0.650 |
| 10 | Epon 828 [4] | | | | 5.700 |
| 11 | 4,4'-dihydroxy-3,3-diphenylhexane | Hexakis(ethoxymethyl)melamine | 0.090 | 0.511 | 0.690 |
| 12 | 3,3'-dihydroxy-5,5-diphenylnonane | ____do____ | 0.100 | 0.650 | 0.840 |
| 13 | 3,3'-dihydroxydiphenylmethane | Hexakis(n-butoxymethyl)melamine | 0.250 | 0.675 | 0.910 |
| 14 | 4,4'-dihydroxy-2,2-diphenylpropane | Hexakis(isobutoxymethyl)melamine | 0.085 | 0.450 | 1.000 |
| 15 | 2,2'-dihydroxydiphenylcyclohexane | Hexakis(methoxymethyl)melamine | 0.200 | 0.650 | 1.125 |

[1] A=4 days.
[2] B=7 days.
[3] C=14 days.
[4] A commercially available liquid condensation product of Bisphenol A-epichlorhydrin, viscosity 25° C., 100-160 poises; Epoxide Equivalent 175-210.

What is claimed is:

1. A composition of matter consisting of a reaction product produced by the reaction of a hexaalkyl ether of a hexamethylolmelamine having the formula

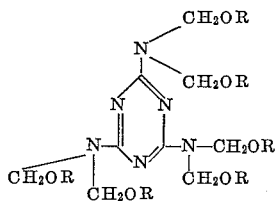

wherein R is an alkyl radical having from 1 to 4 carbon atoms, inclusive, and a bisphenol having the formula

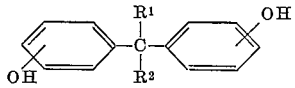

wherein $R^1$ and $R^2$ are selected from the group consisting of hydrogen, an alkyl radical having from 1 to 4 carbon atoms, inclusive, and $R^1$ and $R^2$, in combination with the central carbon atom, constitute a saturated cyclic hydrocarbon of 5 to 6 carbon atoms the central carbon atom being part of said cyclic hydrocarbon.

2. A composition of matter consisting of a thermosetting reaction product produced by the reaction of a hexaalkyl ether of a hexamethylolmelamine having the formula

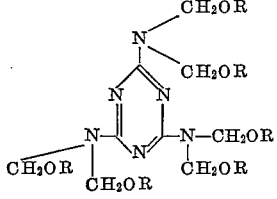

wherein R is an alkyl radical having from 1 to 4 carbon atoms, inclusive, and a bisphenol having the formula

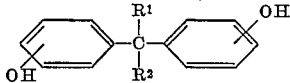

wherein $R^1$ and $R^2$ are selected from the group consisting of hydrogen, an alkyl radical having from 1 to 4 carbon atoms, inclusive, and $R^1$ and $R^2$, in combination with the central carbon atom, constitute a saturated cyclic hydrocarbon of 5 to 6 carbon atoms the central carbon atom being part of said cyclic hydrocarbon.

3. A composition of matter consisting of a thermosetting reaction product produced by the reaction of hexakis(methoxymethyl)melamine and a dihydroxy phenol having the formula

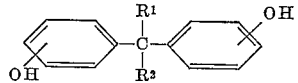

wherein $R^1$ and $R^2$ are selected from the group consisting of hydrogen, an alkyl radical having from 1 to 4 carbon atoms, inclusive, and $R^1$ and $R^2$, in combination with the central carbon atom, constitute a saturated cyclic hydrocarbon of 5 to 6 carbon atoms the central carbon atom being part of said cyclic hydrocarbon.

4. A composition of matter consisting of a thermosetting reaction product produced by the reaction of a hexaalkyl ether of a hexamethylolmelamine having the formula

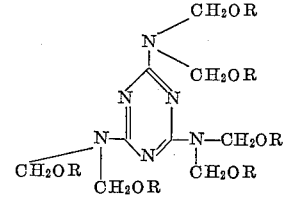

wherein R is an alkyl radical having from 1 to 4 carbon atoms, inclusive, and p,p'-dihydroxy-2,2-diphenylpropane.

5. A composition of matter consisting of a thermosetting reaction product produced by the reaction of hexakis(methoxymethyl)melamine and p,p'-dihydroxy-2,2-diphenylpropane.

References Cited by the Examiner

UNITED STATES PATENTS 2,676,162    4/1954    Marotta _____ 260—38

WILLIAM H. SHORT, *Primary Examiner.*

J. C. MARTIN, *Assistant Examiner.*

Dedication 3,293,212. —*George Edward Power,* Cincinnati, Ohio and *Robert James Kassal,* Gainesville, Fla. THERMOSETTING REACTION PRODUCT OF HEXAKIS-(ALKOXYMETHYL) MELAMINES AND BISPHENOLS. Patent dated Dec. 20, 1966. Dedication filed Mar. 4, 1983, by the assignee, *American Cyanamid Co.*

Hereby dedicates the remaining term of said patent to the Public.
*[Official Gazette May 31, 1983.]*